W. R. WATKINS.
COMBINED SHOVEL AND SIEVE.
APPLICATION FILED MAY 28, 1913.
1,234,835. Patented July 31, 1917.
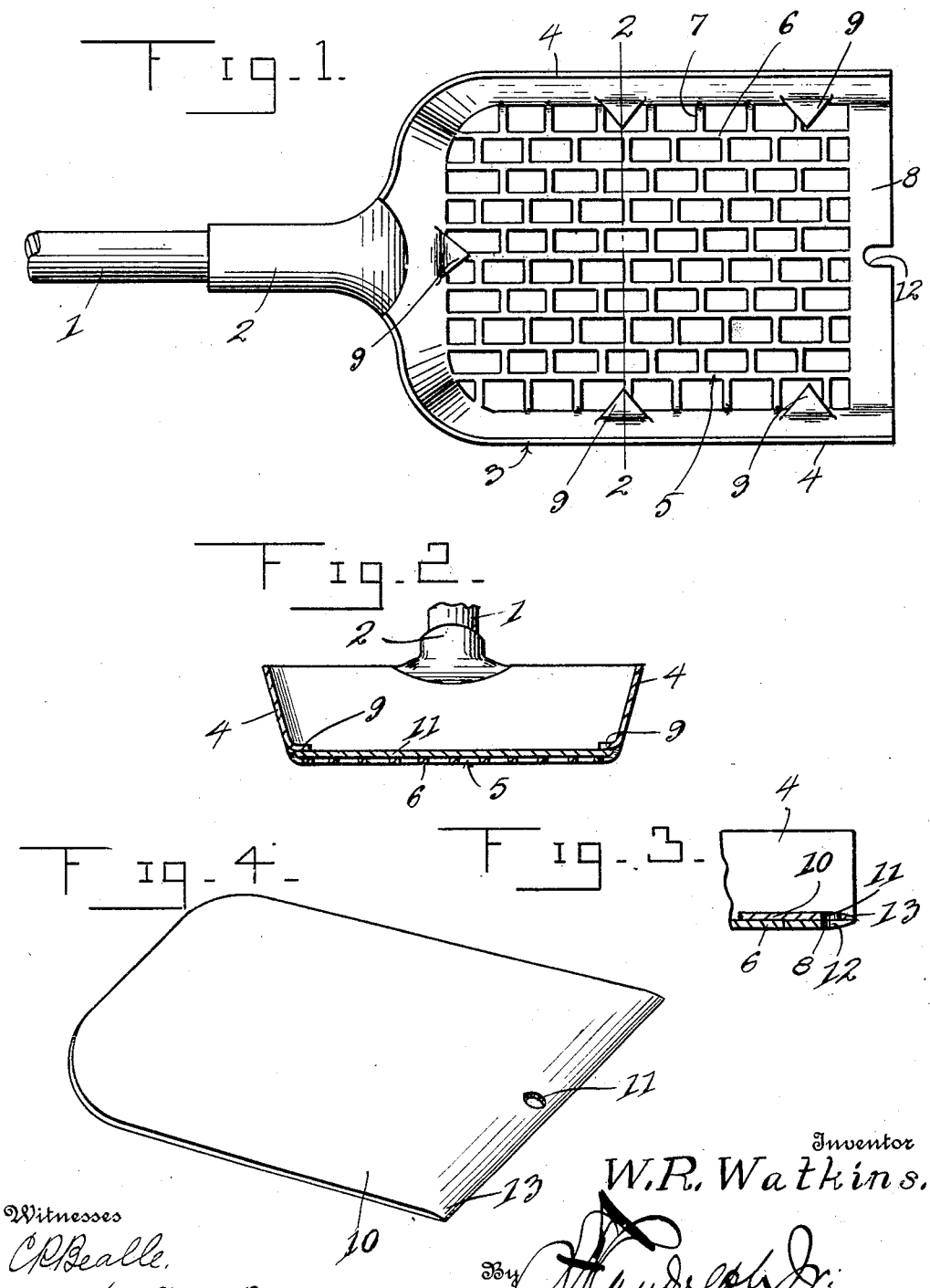

UNITED STATES PATENT OFFICE.

WILLIAM R. WATKINS, OF WOODLAWN, ALABAMA.

COMBINED SHOVEL AND SIEVE.

1,234,835.  Specification of Letters Patent.  Patented July 31, 1917.

Application filed May 28, 1913. Serial No. 770,495.

*To all whom it may concern:*

Be it known that I, WILLIAM R. WATKINS, a citizen of the United States, residing at Woodlawn, in the county of Jefferson and State of Alabama, have invented certain new and useful Improvements in Combined Shovels and Sieves; and I do hereby declare the following to be a full, clear, and exact description of the invention, such as will enable others skilled in the art to which it appertains to make and use the same.

This invention relates to new and useful improvements in combined shovels and sieves, and has for its object to provide a sieve having a removable false bottom, which, when in place, will make the device useful as a shovel.

Another object of my invention is to provide a device which will be simple in construction and durable, and effective in use.

With the above and other objects in view, I will now proceed to describe my invention in the following specification and accompanying drawings, in which, Figure 1 is a plan view of my improved implement showing the same with the false bottom removed;

Fig. 2 is a transverse sectional view of my improved implement taken on line 2—2 of Fig. 1;

Fig. 3 is a detail sectional view of the end of my improved implement; and

Fig. 4 is a perspective view of the false bottom.

Referring to the drawings by characters of reference, 1 indicates the handle of my improved implement, the end of which is adapted to enter the socket 2, which is formed on the end of the pan in the usual manner.

The pan indicated generally at 3 preferably comprises the sides 4, having formed integrally therewith the perforated bottom 5. This perforated bottom is preferably formed, as clearly illustrated in Fig. 1, by punching out the material between the bars 6 and 7, the bars 6 extending longitudinally of the pan and in direct alinement therewith, while the bars 7 extend transversely between the bars 6 and in staggered relation to each other. A transversely extending portion 8 is formed at the open end of the pan and is adapted to act as a means of support for the terminals of the longitudinally extending bars 6.

At suitable intervals along the sides 4 of the pan, and at the rear end directly in alinement with the handle thereof, I provide the triangular-shaped lugs 9, which are stamped from the material out of which the sides are made and bent up, as clearly illustrated in Fig. 2, to form a space between the bottom 5 and the lugs, this space being adapted to receive the side edges of the false bottom 10, which is adapted to be removably secured therein. A suitable aperture 11 is formed adjacent the front edge of the false bottom 10 and is adapted to register with the slot 12 formed in the front edge of the transversely extending portion 8. The front edge of the false bottom 10 has preferably formed thereon a sharpened edge 13. The lugs 9 clampingly engage the solid bottom 10 and in being of triangular shape and disposed with their pointed ends outermost grip the false bottom in such manner that possibility of its slipping out of the shovel is prevented. Furthermore the lugs in being of triangular shape prevent accumulation of matter placed within the shovel about the lugs.

In use it will be obvious that upon placing the false bottom in position the device may be used as a shovel of the ordinary type, but when it is desired to use the device as a sieve the false bottom may be withdrawn by inserting a nail or other instrument in the aperture formed in the front edge thereof, and the material to be sifted thrown upon the perforated surface, and it will be obvious that a sifting action will result.

While in the foregoing I have shown and described the preferred embodiment of my invention, I wish it to be understood that I may change the specific arrangements of parts without in any way departing from the spirit and scope of my invention.

Having thus fully described my invention what I claim is:

1. A combined shovel and sieve comprising a pan having a perforated bottom wall, side walls and a rear end wall, a handle secured to the end wall, a plurality of tongues struck up from the side and end walls and overlying the bottom wall, and an imperforate plate co-extensive in area with and mounted upon the bottom wall beneath the tongues, the upper side of the front portion of the plate being curved downwardly and forwardly and the underside of the front portion of the bottom wall being curved upwardly and forwardly to provide a sharp edge at the front of the pan.

2. A combined shovel and sieve comprising a pan having a perforated bottom wall, side walls and a rear end wall, a handle secured to the end wall, a plurality of tongues struck up from the side and end walls and overlying the bottom wall, and an imperforate plate co-extensive in area with and mounted upon the bottom wall beneath the tongues, the front portion of the plate being provided with an opening and the front portion of the bottom wall having a slot with which the opening registers and which extends through the front edge of the bottom wall.

In testimony whereof I affix my signature in presence of two witnesses.

WILLIAM R. WATKINS.

Witnesses:
J. M. HUEY,
P. LUETTE.

Copies of this patent may be obtained for five cents each, by addressing the "Commissioner of Patents, Washington, D. C."